L. PALMER.
SEED STRIPPER AND HARVESTER.
APPLICATION FILED FEB. 12, 1913.
1,122,798.
Patented Dec. 29, 1914.
4 SHEETS—SHEET 1.
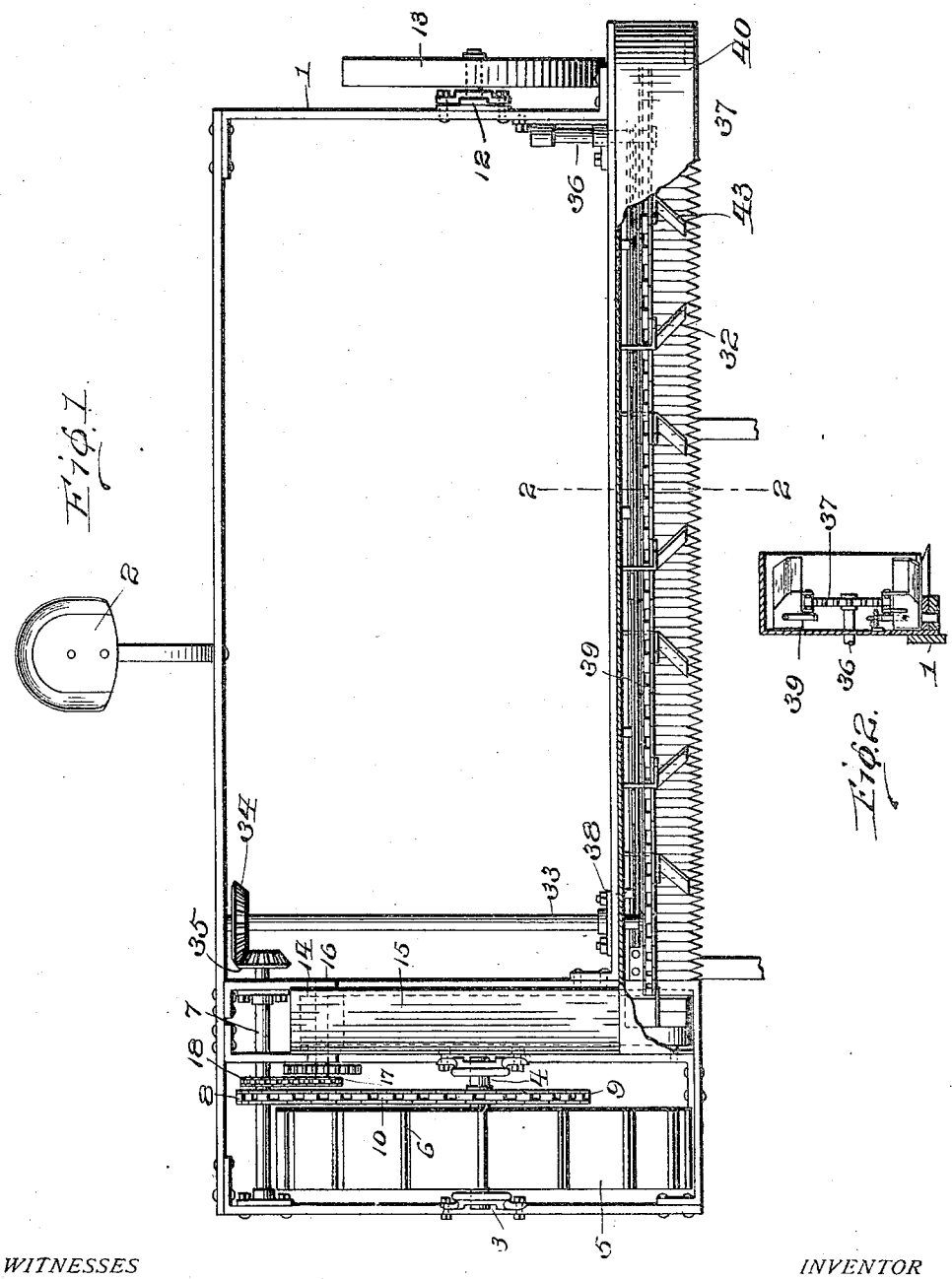
WITNESSES
May Barnes
W. H. Rockwell
INVENTOR
Lettie Palmer
By George W. Ives, Attorney

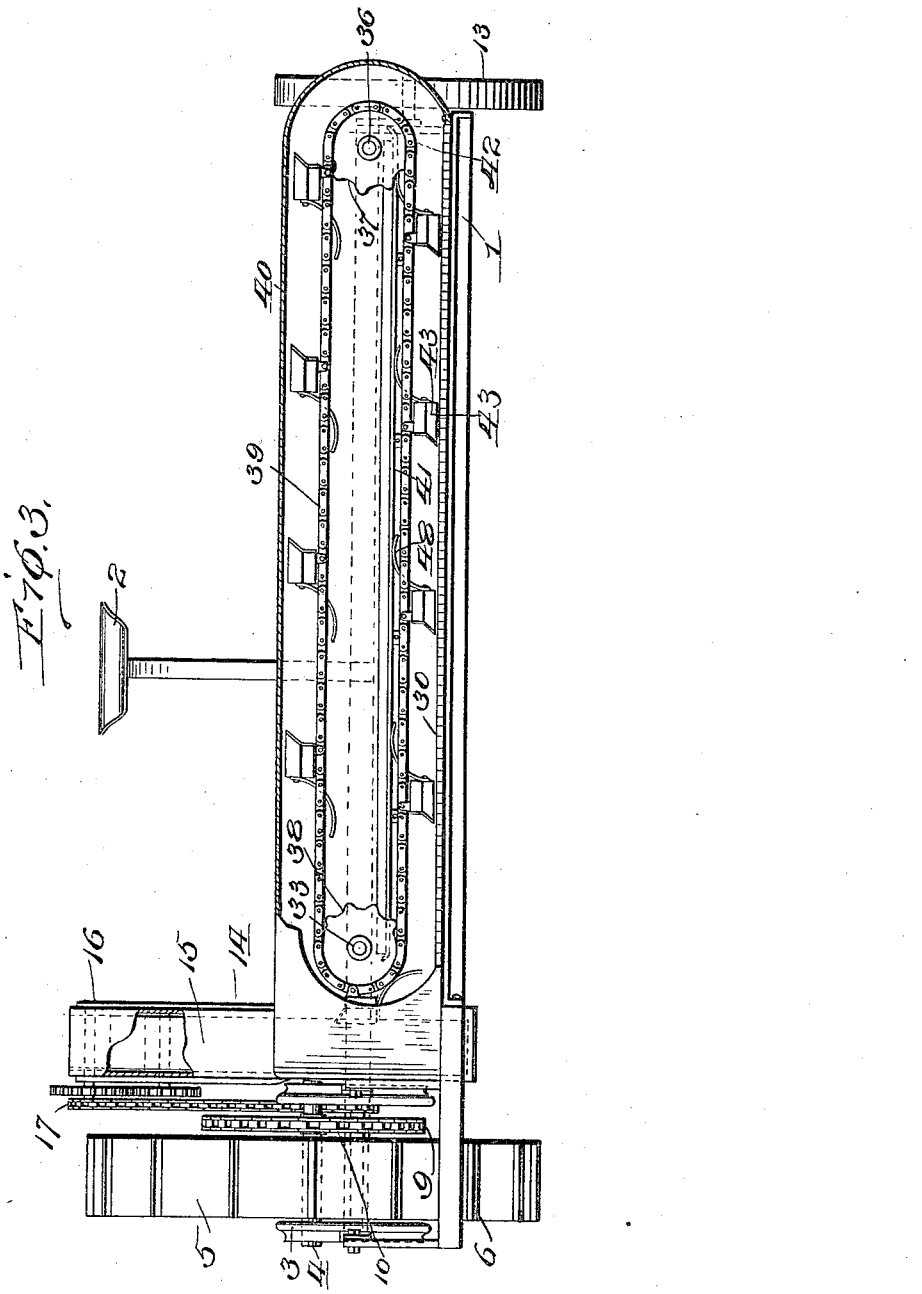

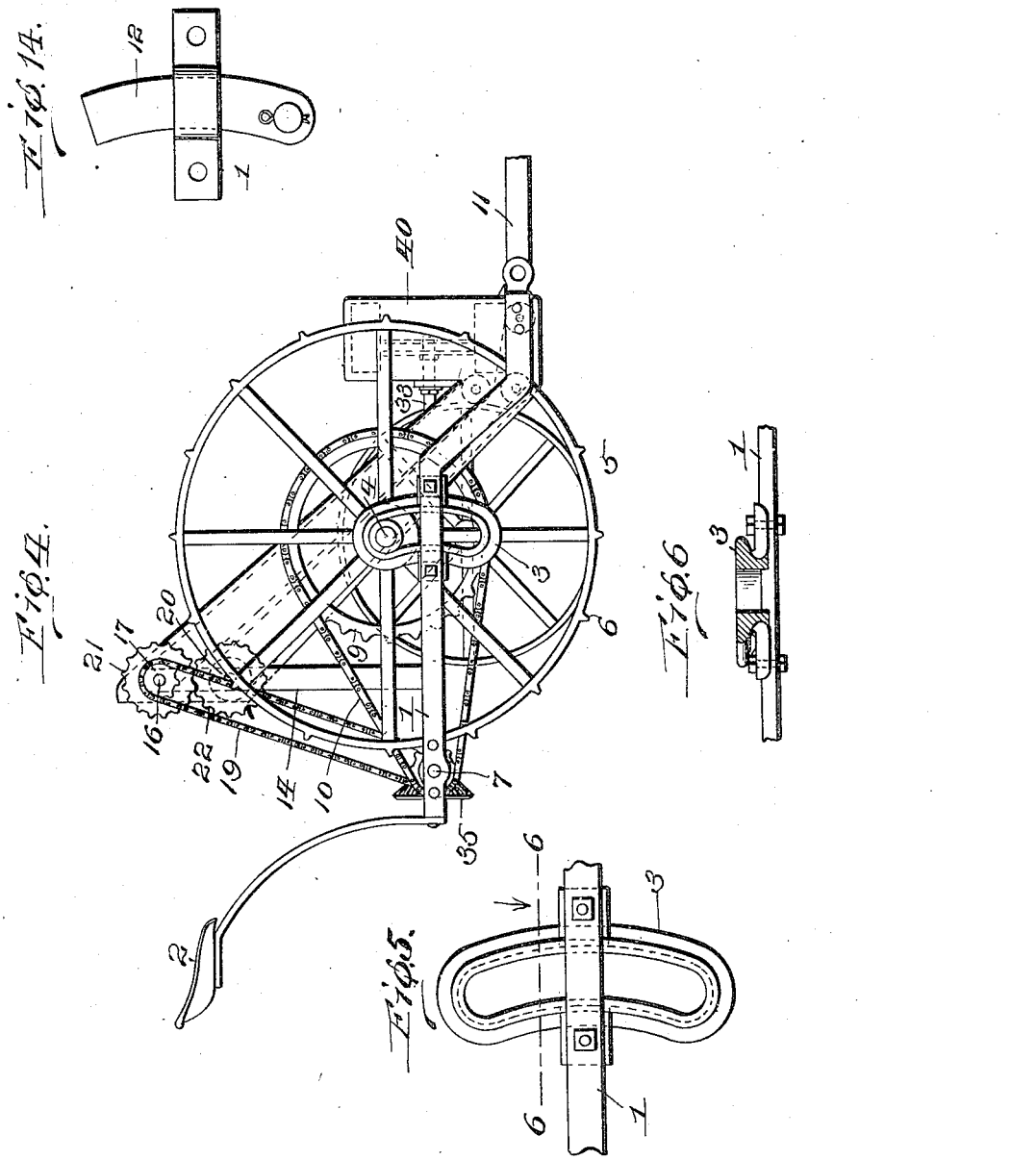

L. PALMER.
SEED STRIPPER AND HARVESTER.
APPLICATION FILED FEB. 12, 1913.
1,122,798.
Patented Dec. 29, 1914.
4 SHEETS—SHEET 4.
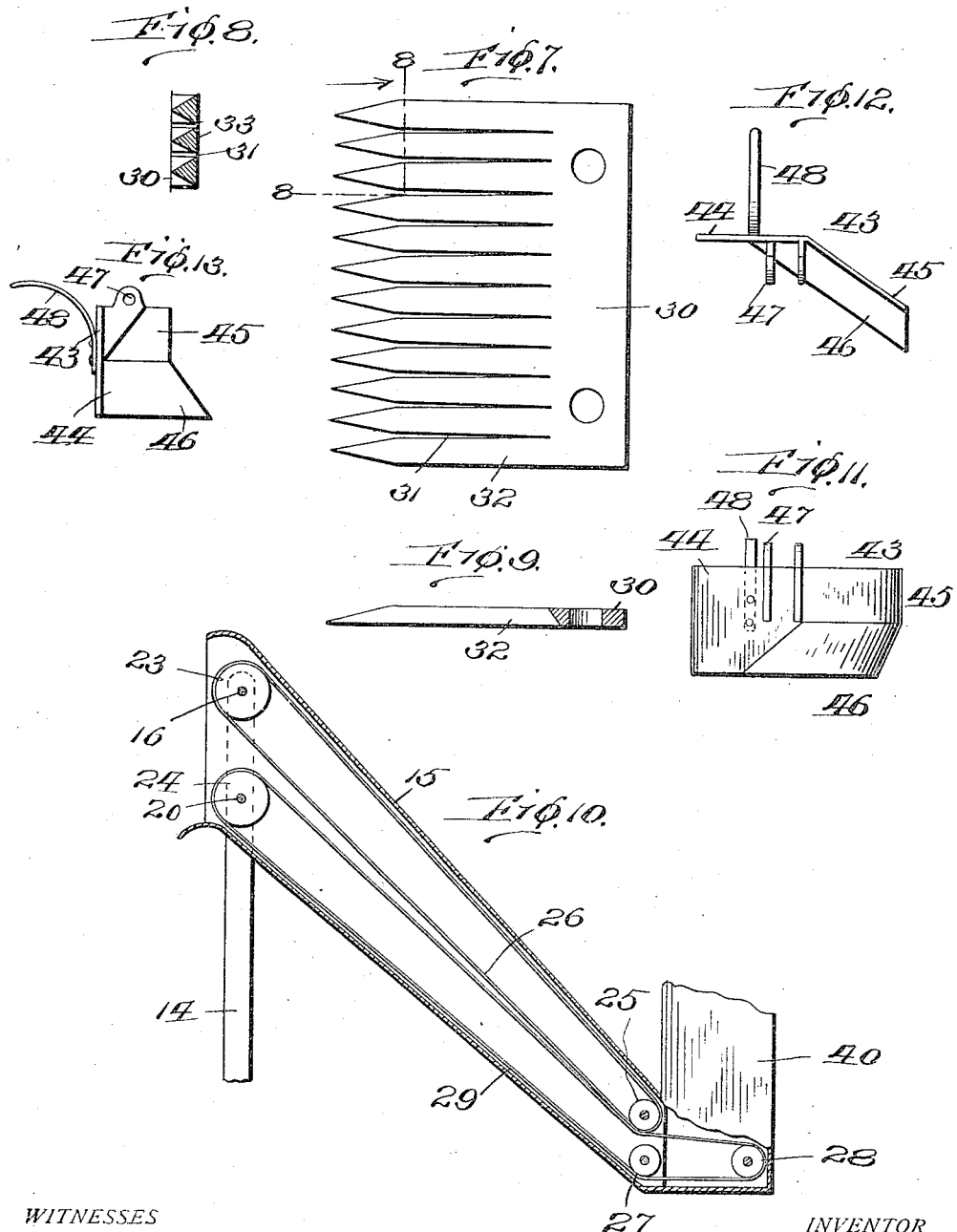

UNITED STATES PATENT OFFICE.

LETTIE PALMER, OF OWINGSVILLE, KENTUCKY.

SEED STRIPPER AND HARVESTER.

1,122,798.  Specification of Letters Patent.  Patented Dec. 29, 1914.

Application filed February 12, 1913. Serial No. 748,027.

*To all whom it may concern:*

Be it known that I, LETTIE PALMER, a citizen of the United States, and a resident of Owingsville, in the county of Bath and State of Kentucky, have invented certain new and useful Improvements in Seed Strippers and Harvesters, of which the following is a specification, reference being had to the accompanying drawings.

This invention has relation to seed strippers and harvesters; and it includes the novel features hereinafter described and particularly pointed out in the claims.

The object of the invention is to provide a machine adapted to move over a field and adapted to operate automatically for removing the seed from standing grasses as for instance—blue grass, oats, red top and the like without removing the stems of the grass from the ground.

Another object of the invention is to provide in conjunction with the machine as indicated, means for raising and lowering the machine so that the seed may be removed from short or tall grass.

A further object of the invention is to provide in a machine of the character indicated means for moving the detached seed to an elevator which in turn is adapted to lift the seed so that it may be deposited in a suitable receptacle.

A still further object of the invention is to provide in a machine as indicated a comb of especial design which is adapted to receive between its teeth the stems of the grass but the spaces between the inner ends of the teeth are not sufficiently large to permit the seed to fall through and consequently the seed is pulled from the stems as the comb moves over the grass.

Another object of the invention is to provide means of especial design and arrangement for sweeping the detached seed along the comb toward the elevator as above described.

With these and other objects in view, the invention consists in certain novel features of construction as hereinafter shown and described, and then particularly pointed out in the claims and in the drawings illustrative of the preferred embodiment of the invention.

In the accompanying drawings:—Figure 1 is a top plan view of the machine with parts broken away. Fig. 2 is a transverse sectional view of a portion of the same cut on the line 2—2 of Fig. 1. Fig. 3 is a front elevation of the machine with parts broken away. Fig. 4 is a side elevation of the machine. Fig. 5 is a detailed side elevation of part of the machine. Fig. 6 is a sectional view of the part shown in Fig. 5 cut on the line 6—6. Fig. 7 is a plan view of part of the comb of the machine. Fig. 8 is a sectional view of part of the comb cut on the line 8—8 of Fig. 7. Fig. 9 is a side elevation of one of the teeth of the comb. Fig. 10 is a longitudinal sectional view of an elevator which constitutes part of the machine. Fig. 11 is a front view of a seed scoop used on the machine. Fig. 12 is a top plan view of said scoop, and Fig. 13 is an end view of the scoop. Fig. 14 is a detail of the standard supporting the ground wheel.

Corresponding and like parts are referred to in the following description and indicated in all the views of the accompanying drawings by the same reference characters.

The machine comprises a frame 1 which may be of any conventional type or configuration. A seat 2 is mounted upon the frame 1 preferably at the rear portion thereof. The frame 1 is provided at one end with arcuate guides 3 and through these guides an axle 4 passes. A bull wheel 5 is mounted upon the axle 4 and is provided upon its periphery with suitable tractors 6. Any suitable means may be provided for moving the axle 4 along the guides 3 or conversely the guides 3 across the said axle but as these means are common in machines of similar nature and form no part of the present invention further description or consideration of the same in this specification is unnecessary.

A shaft 7 is journaled at the rear part of the frame 1 and a sprocket wheel 8 is mounted upon the said shaft. A sprocket wheel 9 is mounted upon the axle 4 and a sprocket chain 10 is trained around the sprocket wheels 9 and 10 and is adapted to transmit rotary movement from the axle 4 to the shaft 7. A draft tongue 11 is connected with the forward part of the frame 1 in any suitable manner. A standard 12 is adjustably mounted at that end of the frame 1 opposite the end thereof at which the bull wheel 5 is mounted and the ground wheel 13 is journaled upon the standard 12 and supports the adjacent end portion of the frame 1. Standards 14 are mounted upon the rear portion of the frame 1 and the rear end of a trunk 15 is supported upon the standards 14 and the forward end of the said trunk is supported at the forward part of the frame 1. The trunk 15 is disposed in an inclined position upwardly and rearwardly in relation to the frame 1. A shaft 16 is journaled for rotation at the upper ends of the trunk 15 and a sprocket wheel 17 is fixed to the said shaft. A sprocket wheel 18 is fixed to the shaft 7 and a sprocket chain 19 is trained around the sprocket wheels 17 and 18 and is adapted to transmit rotary movement from the shaft 7 to the shaft 16.

Another shaft 20 is journaled for rotation at the upper portions of the standards 14. A gear wheel 21 is fixed to the shaft 16 and meshes with the gear wheel 22 fixed to the shaft 20. Therefore the shafts 16 and 20 are caused to rotate in opposite directions. Rollers 23 and 24 shown in Fig. 10 are mounted upon the shafts 16 and 20 respectively. A roller 25 is journaled for rotation at the upper portion of the lower forward end of the trunk 15 and a belt 26 is trained around the rollers 23 and 25. A roller 27 is journaled for rotation at the lower part of the forward end of the trunk 15 and a roller 28 is journaled for rotation at the forward part of the frame 1. A belt 29 is trained around the rollers 24 and 28 and the upper run of the belt 29 passes under the roller 25 and the lower run of the belt 29 passes under the roller 27. The rollers 27 and 28 are approximately at the same level while the roller 24 is elevated and consequently the end portions of the upper and lower runs of the belt 29 are disposed at angles with relation to each other. The roller 28 is located in advance of the rollers 25 and 27 and consequently a portion of the upper run of the belt 29 is located in advance of the forward end of the belt 26. The upper run of the belt 29 extends at an angle to the lower run of the belt 26, as shown in Fig. 10. The belts 26 and 29 constitute seed elevators, and the seed is deposited upon the forward end of the upper run of the belt 29 and is carried back between the rollers 25 and 27 and then the adjacent runs of the belts 26 and 29 carry the seed in an upward direction toward the rear of the machine and suitable means may be provided at the upper rear end of the trunk 15 for the reception of the seed.

The means for stripping the seed from the stems of the grass or plants includes a comb which is located at the forward side of the frame 1. This comb consists of a plate 30 and is best illustrated in Figs. 7, 8 and 9. The forward portion of the plate 30 is divided by incisions 31 into teeth 32. These teeth are pointed at their forward ends and the spaces or incisions 31 between the teeth are approximately V-shaped in plan. The teeth 32 are approximately V-shaped in transverse section as shown in detail in Fig. 8 and the upper surfaces of the teeth 32 lie in the same horizontal plane.

A shaft 33 is journaled upon the frame 1 and is provided at its rear end with a beveled pinion 34 which meshes with the beveled pinion 35 mounted upon the shaft 7. A stub shaft 36 is mounted upon the frame 1 and carries a sprocket wheel 37. A sprocket wheel 38 is fixed to the shaft 33 and a sprocket chain 39 is trained around the wheels 37 and 38. A hood 40 is located over the chain 39. Wheels 37 and 38 connect with the ends of the plate 30. A track 41 is located under the hood 40 between the wheels 37 and 38 and one end of the said track is upwardly curved as at 42, and scoops of especial design are carried by the chain 39. These scoops are preferably made from sheet metal and the scoops are indicated in general at 43. As these scoops are all alike a description of one will answer. Each scoop is provided with a vertical rear portion 44 which is adapted to move along the plate 30 in a plane at a right angle to the same. The plane of the portion 44 is parallel to a vertical plane passing vertically through the line of draft of the machine. Each scoop includes a portion 45 which is vertically disposed and which is pitched at an angle to the plane of the portion 44 with relation to the line of draft of the machine. Each scoop includes a portion 46 which is inclined with relation to a horizontal with its lower edge forwardly disposed. The lower edge of the portion 46 is adapted to move transversely across the teeth 32 of the comb. The long dimension of the portion 46 is disposed at an acute angle to the line of draft of the machine so that when the portion 46 encounters the seed which is located upon the upper surfaces of the teeth the said seed is deflected rearwardly toward the solid portion of the plate 30 and then the lower part of the portion 44 sweeps the seed along the plate 30 toward the upper run of the belt 29. Each scoop is provided with lugs 47 which are pivotally connected with the links of the chain 39. Each scoop is provided with a curved spring arm 48 which is adapted to engage the underside of the track 41 when the said scoops are over the plate 30 and thus the scoops are held resiliently against the plate. The upturned end 42 of the track 41 is first engaged by the spring arms 48 and serves to bring the lower portions of the scoops down in proper position upon the plate 30. Therefore it will be seen that as the machine is drawn over a field of standing grass the stems of the grass are received in the incisions between the teeth 32 and the seed is pulled from the stems and is left upon the upper surfaces of the teeth. The scoops then move transversely of the teeth and encounter the seed and moves it back over the solid or closed portion of the plate 30. The seed is then moved to the end of the said plate and deposited upon the upper run of the lower belt and the said belts then elevate the seed so that it may be bagged or collected as hereinbefore indicated. Therefore a simple machine is provided for stripping and harvesting small seed without removing or disturbing the position of the grass upon the soil.

Having described the invention what is claimed is:—

1. In a machine of the character described, in combination, a supporting frame, a comb located at the front side of said frame comprising a plate divided into pointed V-shaped teeth, a driving shaft, a stub shaft opposite said driving shaft, an endless chain actuated by said shafts the lower run of said chain passing above said plate, and a plurality of scoops secured to said chain each scoop including a vertical rear portion adapted to move along said plate in a plane at right angles to the same, the plane of said rear portion being parallel to a vertical plane passing through the line of draft of the machine, each scoop further including a portion which is vertically disposed and pitched at an angle to the plane of said rear portion with relation to the line of draft, each scoop further including an inclined portion with its lower edge forwardly disposed said lower edge adapted to move transversely across said teeth, the long dimension of said inclined portion being disposed at an acute angle to the line of draft of the machine.

2. In a machine of the character described, in combination, a supporting frame, a comb located at the front side of said frame comprising a plate divided into pointed V-shaped teeth, a driving shaft, a stub shaft opposite said driving shaft, an endless chain actuated by said shafts the lower run of said chain passing above said plate, a plurality of scoops secured to said chain each scoop including a vertical rear portion adapted to move along said plate in a plane at right angles to the same, the plane of said rear portion being parallel to a vertical plane passing through the line of draft of the machine, each scoop further including a portion which is vertically disposed and pitched at an angle to the plane of said rear portion with relation to the line of draft, each scoop further including an inclined portion with its lower edge forwardly disposed said lower edge adapted to move transversely across said teeth, the long dimension of said inclined portion being disposed at an acute angle to the line of draft of the machine, a track located between said shafts, and a spring arm secured to each scoop adapted to engage the underside of said track to resiliently hold said scoops against said plate.

3. In a device of the character described, a comb, a track located above said comb, an endless chain, buckets carried by said chain adapted to pass over said comb and below said track, and a spring carried by said buckets engaging said track to force said buckets against said comb.

In testimony whereof I affix my signature, in the presence of two witnesses.

LETTIE PALMER.

Witnesses:
T. J. PETERS,
L. B. PETERS.

Copies of this patent may be obtained for five cents each, by addressing the "Commissioner of Patents, Washington, D. C."